(No Model.)
D. LIPPY.
VEHICLE SPRING.
No. 452,756. Patented May 19, 1891.
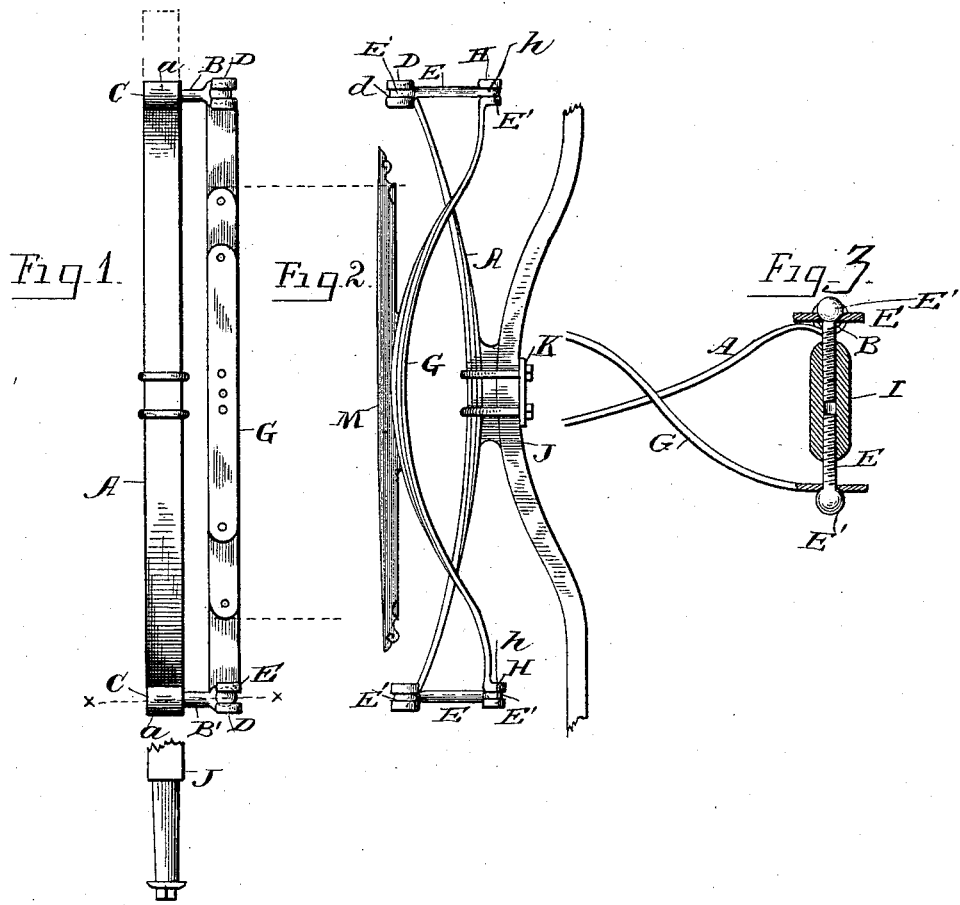
Witnesses:
J. B. McGirr
Wm. N. Moore
Inventor.
David Lippy,
by Thomas E. Barrow,
Attorney

UNITED STATES PATENT OFFICE.

DAVID LIPPY, OF MANSFIELD, ASSIGNOR TO DANIEL L. SPOTTS, OF CANTON, OHIO.

VEHICLE-SPRING.

SPECIFICATION forming part of Letters Patent No. 452,756, dated May 19, 1891.

Application filed December 27, 1890. Serial No. 375,938. (No model.)

*To all whom it may concern:*

Be it known that I, DAVID LIPPY, a citizen of the United States, residing at Mansfield, in the county of Richland and State of Ohio, have invented certain new and useful Improvements in Vehicle-Springs; and I do declare the following to be a full, clear, and exact description of the invention, such as will enable others skilled in the art to which it appertains to make and use the same.

My invention relates to vehicle-springs; and the objects of my invention are, first, to provide a cheap, durable, and efficient spring for two or four wheeled vehicles; second, to so construct the spring that the vehicle-body will have a swinging motion in any direction, obviating all danger in breaking the springs when the running-gear is on a twist. I attain these objects by the construction shown and illustrated in the accompanying drawings, in which—

Figure 1 is a top view of my vehicle-spring embodying my invention. Fig. 2 is a side elevation of same. Fig. 3 is a detail view of my spring having adjustable connections for the spring.

Similar letters refer to similar parts throughout the several views.

A indicates the axle-spring, which is formed at each end with an eye or thimble $a$, in which are secured one end of the arms B and B', having cups D at the free ends thereof, said cups having each a slot $d$ therein to allow the entrance of the rods E, which have a ball E' at each end.

The body-spring G is provided at each end with a cup H, also having a slot $h$ to allow the entrance of the rods E, the balls on said rods fitting in the cups, as clearly shown. In the form shown in Fig. 3 the rods E are threaded and are adjustable in the threaded sleeve I.

From this construction it will be seen that the spring members are allowed a universal movement and are adjustable.

In a four-wheeled vehicle the spring A is secured to the axle and in line with the axle J by clips K. The body-spring is secured upon the body by the spring-bar M, both the front and back spring. In a two-wheeled vehicle the elliptical spring A is secured crosswise upon the axle and in line with the wheels, one on each side of the body. A cross-bar is secured to the under side of the vehicle-seat, the ends secured to the center of the body-spring G supporting the body by the connections connecting the elliptical springs A and G together, giving to the vehicle-body a swinging motion, obviating all horse motion to the said vehicle-body.

Having fully described my invention, what I claim as new, and desire to secure by Letters Patent, is—

1. A vehicle-spring consisting of the member having the ends formed with eyes or thimbles, the arms having one end fitting in said thimbles and formed with cups, the spring member having cups, and the rods having balls fitting and bearing in the cups of the arms and spring.

2. A vehicle-spring consisting of the axle-spring, the arms carried by said spring and formed with cups, the body-spring formed with cups, the rods having balls arranged in said cups, and the sleeve on the rods for adjusting said springs.

In testimony whereof I affix my signature in the presence of two witnesses.

DAVID LIPPY.

Witnesses:
C. W. MARRIOTT,
H. D. KIRTH.